Jan. 31, 1961
E. H. SHARP
2,969,659
UNIVERSAL JOINT
Filed Jan. 27, 1958
3 Sheets-Sheet 1
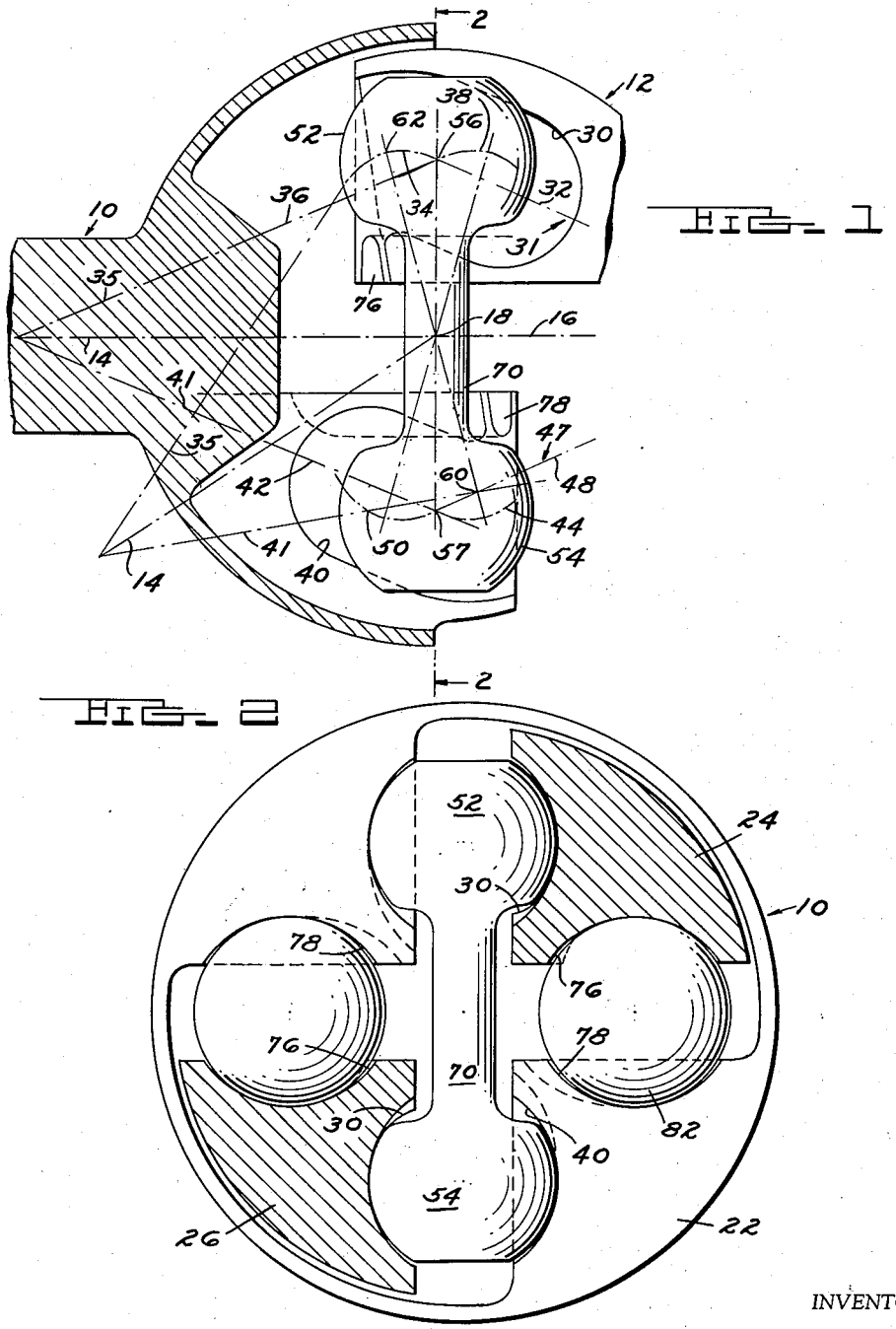
INVENTOR.
EVERETT H. SHARP
BY
Whittemore, Hulbert & Belknap
ATTORNEYS

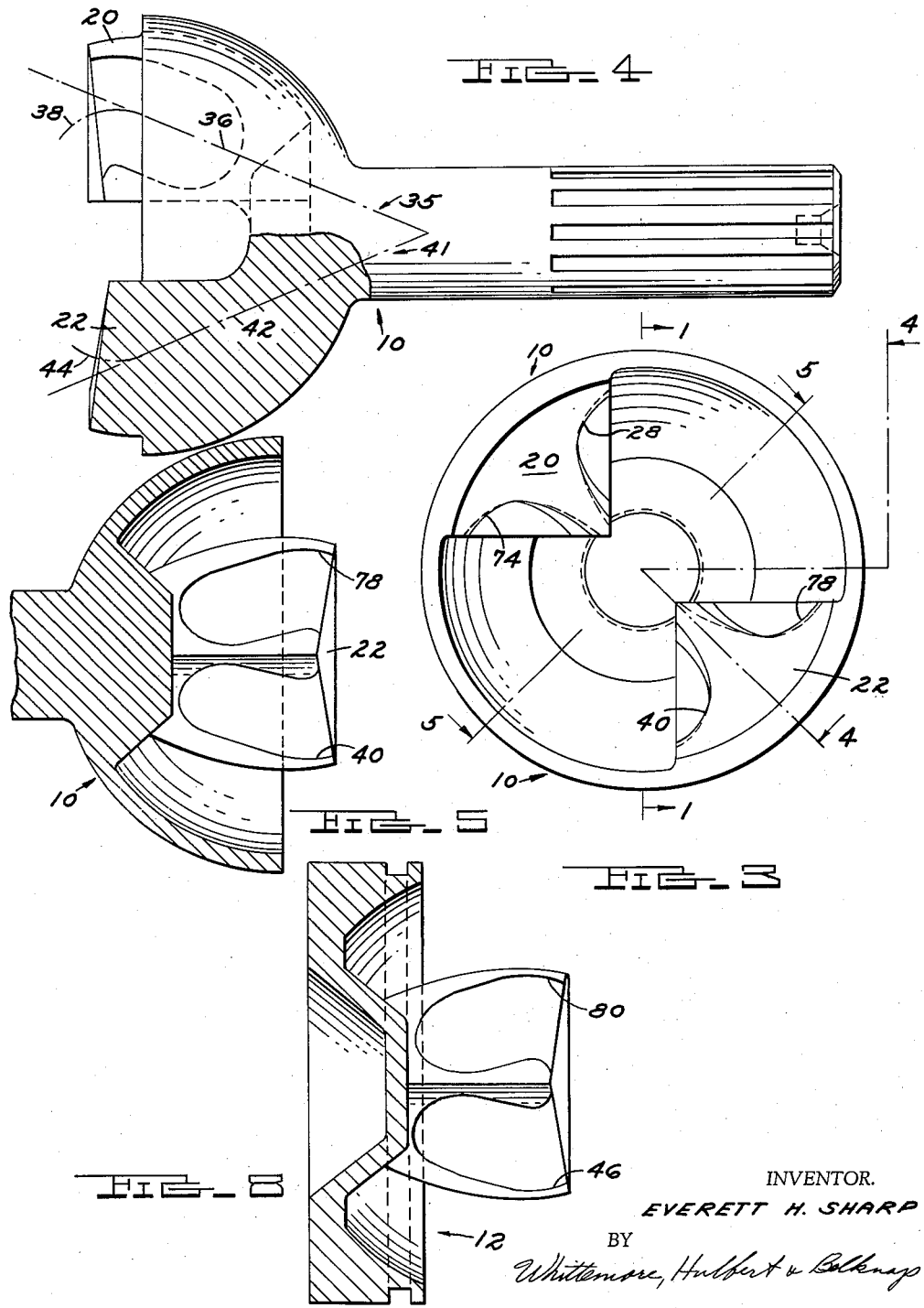

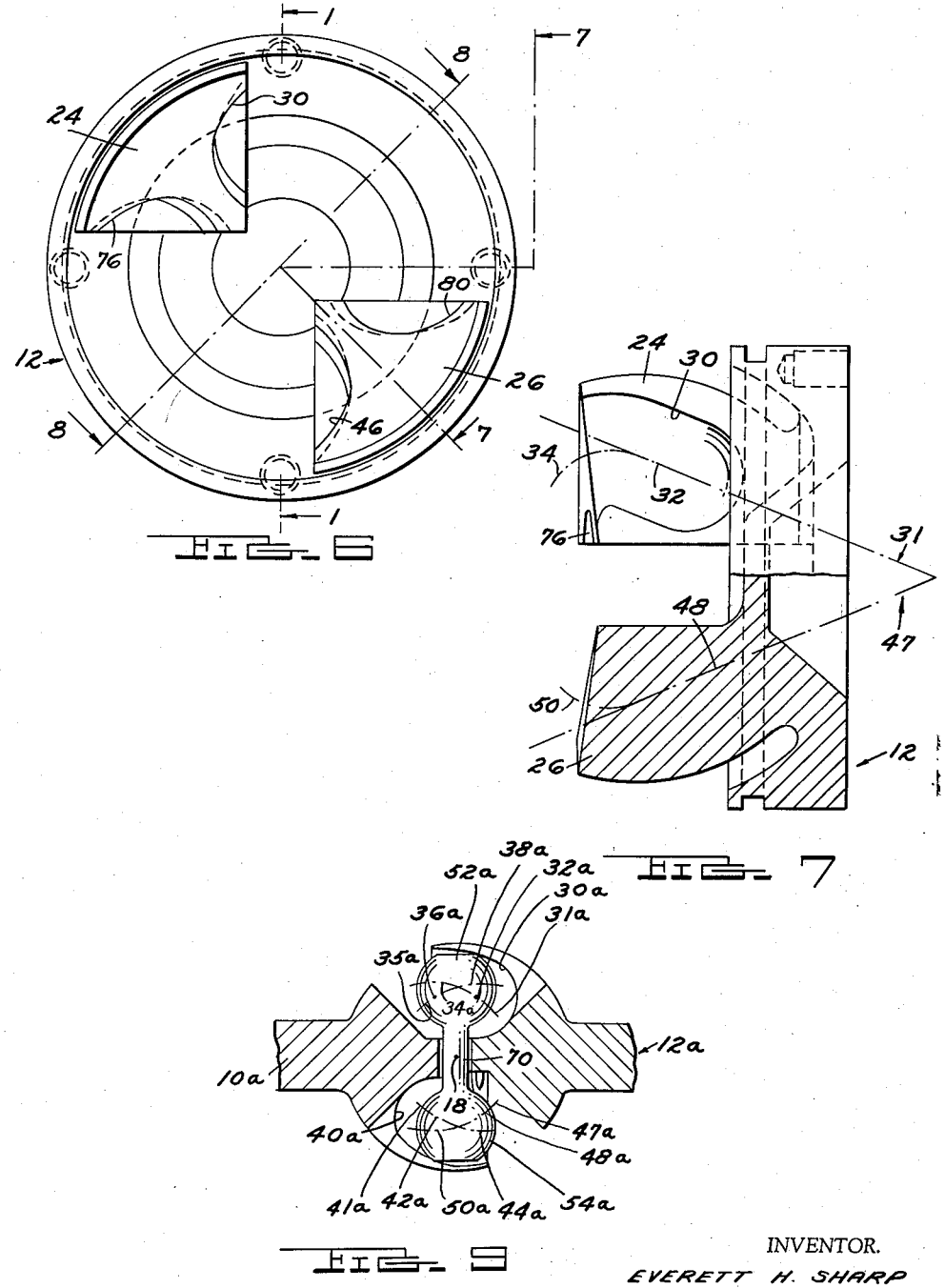

United States Patent Office 2,969,659
Patented Jan. 31, 1961

2,969,659
UNIVERSAL JOINT

Everett H. Sharp, Berkley, Mich., assignor, by mesne assignments, to Dana Corporation, Toledo, Ohio, a corporation of Virginia Filed Jan. 27, 1958, Ser. No. 711,510
26 Claims. (Cl. 64—21)

This invention relates to torque transmitting universal joints of the constant velocity type.

One object of the invention is to provide a constant velocity universal joint having novel means for holding the members in assembled relation.

Another object is to provide a constant velocity universal joint of increased torque capacity.

Still another object is to provide a constant velocity universal joint in which the orbit of the balls is more nearly circular than in prior constructions, thereby reducing angular and radial acceleration.

A further object is to shape the ball grooves of the joint so that the angle between the grooves is substantially constant, preferably within a range of 30°–40°, throughout the normal operating range of the joint.

Other objects and features of the invention will become apparent as the description proceeds, especially when taken in conjunction with the accompanying drawings illustrating preferred embodiments of the invention, wherein:

Fig. 1 is a central longitudinal sectional view of a constant velocity universal joint embodying the invention, with parts broken away, the section being taken on the line 1—1 of Figs. 3 and 6.

Fig. 2 is a sectional view taken on the line 2—2 of Fig. 1.

Fig. 3 is an end elevation of one of the rotary members of the joint.

Fig. 4 is a view, partly in elevation and partly in section, taken on the line 4—4 of Fig. 3.

Fig. 5 is a sectional view taken on the line 5—5 of Fig. 3.

Fig. 6 is an end elevation of the other rotary member.

Fig. 7 is a view partly in elevation and partly in section, taken on the line 7—7 of Fig. 6.

Fig. 8 is a sectional view taken on the line 8—8 of Fig. 6.

Fig. 9 illustrates a modification.

Referring now more particularly to the drawings, the universal joint comprises the two rotary members 10 and 12 which have the longitudinally extending axes 14 and 16 respectively. In the assembled relation of the joint, shown in Figs. 1 and 2, the rotary members 10 and 12 are angularly movable relative to each other about a fixed intersecting point 18 in their axes.

The rotary member 10 is formed on diametrically opposite sides of its axis with the axially extending lugs 20 and 22 which are identical. The rotary member 12 is formed on diametrically opposite sides of its axis with the axially extending lugs 24 and 26 which are identical. In the assembled relation of the joint, the lugs are interspersed with one another.

The opposed faces of the interspersed lugs are fashioned to form grooves for receiving and embracing the balls of the joint. The lugs 20 and 24 have the opposed ball grooves 28 and 30 respectively. The axis 31 of the ball groove 30, shown in Fig. 1, has the straight portion 32 and the curved outer end portion 34. The straight portion 32 intersects the axis of the rotary member 12 at a predetermined angle and the curved outer end portion of the groove axis curves back towards the axis of the rotary member. The groove 28 has the same shape as the groove 30 and, as seen in Fig. 4, the straight portion 36 of the groove axis 35 intersects the axis of the rotary member 10 at the same angle as the straight portion of the axis of groove 30, and the outer end portion 38 of the groove axis 31 curves back towards the axis of the rotary member.

Lug 22 of rotary member 10 has a ball groove 40 which is shaped exactly like the ball groove 28 with its axis 41 having a straight portion 42 which intersects the axis of the rotary member 10 at the same angle as the straight portion of the axis of groove 28 and the outer end portion 44 which is curved back towards the axis of the rotary member. The lug 26 of rotary member 12 has a ball groove 46 which is opposed to groove 40 and is shaped exactly like the groove 30 with its axis 47 having a straight portion 48 which intersects the axis of the rotary member 12 at the same angle as the straight portion of the axis of groove 30 and the outer end portion 50 which is curved back towards the axis of the rotary member.

A ball 52 is received in and embraced by the grooves 28 and 30 and a ball 54 is received in and embraced by the grooves 40 and 46. The ball 52 is located with its center on the intersection of the axes 31 and 35, and the ball 54 is located with its center on the intersection of the axes 41 and 47. Throughout the angular movement of the rotary members relative to each other, the balls 52 and 54 will remain at the intersection of the axes of the grooves in which they are located. In the straight condition of the joint in which the axes 14 and 16 lie on a straight line, the intersection of the axes 31 and 35 is at the junction of the straight and curved portions of each axis, and the same is true of the axes 41 and 47. These points of intersection, in the straight condition of the joint, are indicated at 56 and 57. The ball grooves are shaped so that the dstance between the intersection of the axes 31 and 35 and the intersection of the axes 41 and 47 is constant in all operative positions of the rotary members, and the pivot center 18 lies on a straight line connecting these intersections. Therefore the distance between the balls 52 and 54 will remain constant whether the rotary members are in the straight condition illustrated or in some other angular position in which the rotary members form an oblique angle with each other.

Assuming that the rotary member 10 is swung about the fixed point 18 to the position illustrated in Fig. 1 in which the axis 14 assumes the dotted line position, the straight portion of the groove axis 41 will intersect the straight portion of the groove axis 47 at the point 60. The curved portion of the axis 31 will intersect the curved portion of the axis 35 at the point 62. The distance between the points 60 and 62 is the same as the distance between the points 56 and 57 in the straight condition of the joint. The unchanging distance between the points of intersection of the axes 31, 35 and 41, 47 results from the configuration of the curved portions of their axes which are laid out to maintain this fixed relationship.

The balls 52 and 54 are rigidly interconnected by a strut 70 so that the balls and strut form an integral unit. By reason of the fact that the balls 52 and 54 are not required to move apart or towards each other during the angular movement of the rotary members of the joint, the rigid strut connecting the balls will not interfere with the operation of the joint. However, the strut interconnecting the balls will prevent the rotary members from being pulled apart since in order to pull apart the rotary members the balls 52 and 54 would be forced to spread apart by the configuration of the grooves. Similarly, the strut prevents the rotary members from being forced toward each other because, to do this, the balls 52 and 54 would have to move toward each other. Accordingly, this construction of universal joint eliminates the necessity for a central tie connection between the rotary members to hold the assembly, as heretofore considered necessary. The rotary members of the joint are held together by the cooperation between the balls 52 and 54, the integral strut 70 and the ball grooves.

The joint may be assembled and disassembled by relatively rotating the rotary members beyond the normal operating range of the joint to enable the balls to be removed from the open ends of the grooves.

The lugs 20 and 24 also have the ball grooves 74 and 76 respectively which are preferably of the same configuration as the grooves 28 and 30 and bear the same relationship to each other. The lugs 22 and 26 have the ball grooves 78 and 80 respectively which are preferably of the same configuration as the grooves 40 and 46 and bear the same relationship to each other. Individual spherical balls 82 are provided and are respectively received in the opposed grooves 74, 76 and 78, 80.

A further advantage of the invention is that the balls 52, 54 and 82 have a more nearly circular orbit than they would have if the groove axes were entirely straight from end to end. This can be visualized if it is assumed that the axes 31 and 35 are straight in Fig. 1 in which case the point of intersection 62 would lie substantially radially outwardly from its present position. For this reason, it is desirable that the grooves for the balls 82 also have the configuration of the grooves for supporting the balls 52 and 54. However, apart from this consideration, the grooves for the balls 82 may be entirely straight.

The construction of Fig. 9 is essentially the same as that of Figs. 1–5 and corresponding parts are identified with the same numbers followed by "a." The Fig. 9 construction differs from that first described only in the shape of the grooves. The axis 31a of ball groove 30a has the curved portions 32a and 34a. Curved portion 34a corresponds to curved portion 34 of groove axis 31. Groove axis 35a has the same shape as groove axis 31a, and comprises portions 36a and 38a. Portion 38a corresponds to portion 38 of groove axis 35. The axis 41a of groove 40a has portions 42a and 44a, the latter corresponding to portion 44 of groove axis 41. Groove axis 47a has portions 48a and 50a, the latter corresponding to portion 50 of groove axis 47.

The groove axes 31a, 35a, 41a and 47a are so formed that the distance between the intersections of axes 31a and 35a and of axes 41a and 47a is constant throughout the working range of the joint, and the pivot center 18 lies on a straight line through the intersections throughout the working range. In the embodiment of Fig. 9, the portions 32a and 36a are curved so that the intersection between the groove axes will form an angle of 30°–40° within the entire range of operation of the joint. In other words, if the members 10a and 12a are angularly moved relative to one another through their normal ange of angular movement, which might be 30°, for example, the angle between the axes of the associated ball grooves, i.e. groove axes 31a and 35a, will remain within a range of 30°–40°. This small variation in the angle is not important. If the angle between the groove axes is too large, the amount of sliding of the balls is excessive, reducing the efficiency of the joint because of the added heat generated. If this angle is too small, it is difficult to locate the balls at the intersection of the grooves and the joint becomes noisy.

The portions 42a and 48a of groove axes 41a and 47a are formed the same as the portions 32a and 36a of groove axes 31a and 35a, as are all the other sets of associated grooves. Other than this, the joint shown in Fig. 9 is essentially the same as that in Figs. 1–5.

It will be understood that the groove axes of each member, in both constructions, all intersect at a common point on the axis of rotation thereof, the pivot point 18 of the joint lying midway between these points of intersection.

What I claim as my invention is:

1. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member toward said other member, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes, and means for holding said members in assembled relation for movement as aforesaid about said fixed intersecting point in their axes including a direct connection between the balls in said two sets of grooves maintaining the distance between said last-mentioned balls constant.

2. A universal joint as defined in claim 1 in which said two sets of grooves are diametrically opposed to each other.

3. A universal joint as defined in claim 1 in which there are a third and a fourth set of opposed grooves in the opposed faces of adjacent lugs, the grooves of each of said third and fourth sets being so fashioned that the distance between the points of intersection of the axes thereof is constant in all operative positions of said members relative to each other about the fixed intersecting point in their axes.

4. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member, a ball in each set of opposed grooves at the intersection of the axes thereof, the grooves of each of two sets having arcuate and straight sections and being so fashioned that the distance between the points of intersection of the axes thereof is constant in all operative positions of said members relative to each other about the fixed intersecting point in their axes.

5. A universal joint as defined in claim 4 in which there are a third and a forth set of opposed grooves in the opposed faces of adjacent lugs, the grooves of each of said third and fourth sets being so fashioned that the distance between the points of intersection of the axes thereof is constant in all operative positions of said members relative to each other about the fixed intersecting point in their axes.

6. A universal joint as defined in claim 5 in which said two sets of grooves are diametrically opposed to each other, and said third and fourth sets of grooves are diametrically opposed to each other.

7. A constant velocity universal point comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member toward said other member, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes, and means for holding said members in assembled relation for movement as aforesaid about said fixed intersecting point in their axes including a direct connection between the balls in said two sets of grooves maintaining the distance between said last-mentioned balls constant, the grooves of each set being so fashioned that the angle between their axes at the intersection thereof is substantially the same in all angular positions of said members within the normal operating range thereof.

8. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes, and means for holding said members in assembled relation for movement as aforesaid about said fixed intersecting point in their axes including a connection between the balls in said two sets of grooves maintaining the distance between said last-mentioned balls constant, said two sets of grooves being diametrically opposed to each other, said connection being a rigid strut rigidly joined at its ends to said last-mentioned balls.

9. A universal joint as defined in claim 8 in which said strut is integral with said last-mentioned balls.

10. A universal joint as defined in claim 9 in which the axes of the grooves of said two sets are straight throughout the major portion of their lengths and terminate at the outer ends thereof in a hook curved toward the axis of the corresponding member, the axes of the grooves of said two sets intersecting at the junction between the straight and curved portions thereof when the angle between the axis of said members is 180°.

11. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes, means for holding said members in assembled relation for movement as aforesaid about said fixed intersecting point in their axes including a connection between the balls in said two sets of grooves maintaining the distance between said last-mentioned balls constant, a third and a fourth set of opposed grooves in the opposed faces of adjacent lugs, the grooves of each of said third and fourth sets being so fashioned that the distance between the points of intersection of the axes thereof is constant in all operative positions of said members relative to each other about the fixed intersecting point in their axes, the axes of the grooves of said two sets and said third and fourth sets are straight throughout the major portion of their lengths and terminate at the outer ends thereof in a hook curved toward the axis of the corresponding member, the axes of the grooves of said two sets and said third and fourth sets intersecting at the junction between the straight and curved portions thereof when the angle between the axes of said members is 180°, said two sets of grooves being diametrically opposed to each other and said third and fourth sets of grooves being diametrically opposed to each other.

12. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes, a third and a fourth set of opposed grooves in the opposed faces of adjacent lugs, the grooves of each of said third and fourth sets being so fashioned that the distance between the points of intersection of the axes thereof is constant in all operative positions of said members relative to each other about the fixed intersecting point in their axes, the axes of the grooves of said two sets and said third and fourth sets being straight throughout the major portion of their lengths and terminating at the outer ends thereof in a hook curved toward the axis of the corresponding member, the axes of the grooves of said two sets and said third and fourth sets intersecting at the junction between the straight and curved portions thereof when the angle between the axes of said members is 180°, said two sets of grooves being diametrically opposed to each other and said third and fourth sets of grooves being diametrically opposed to each other.

13. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes, and means for holding said members in assembled relation for movement as aforesaid about said fixed intersecting point in their axes including a connection between the balls in said two sets of grooves maintaining the distance between said last-mentioned balls constant, the grooves of each set being so fashioned that the angle between their axes at the intersection thereof is substantially the same in all angular positions of said members within the normal operating range thereof, said two sets of grooves being diametrically opposed and said connection being a rigid strut rigidly and integrally joined at its ends to said last-mentioned balls.

14. A universal joint as defined in claim 13 in which the angle between the axes of the grooves of each set is within the range of 30°–40°.

15. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, a ball in each set of opposed grooves at the intersection of the axes thereof and connecting means between two of said balls secured to said balls.

16. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, a ball in each set of opposed grooves at the intersection of the axes thereof and radially extending connecting means between the balls of two diametrically opposed sets of grooves adapted to prevent radial separation therebetween.

17. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, a ball in each set of opposed grooves at the intersection of the axes thereof and a strut rigidly joined at its ends to the balls of two diametrically opposed sets of grooves.

18. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and having arcuate and straight portions, said straight portions of said axes diverging radially outwardly of said grooves, and a ball in each set of opposed grooves at the intersection of the axis thereof.

19. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, the axes of said grooves being straight throughout the major portion of their lengths and terminating at the outer ends thereof in a hook curved toward the axis of the corresponding member, said straight portions of said axes diverging radially outwardly of said grooves.

20. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and having arcuate and straight portions, said straight portions of said axes diverging radially outwardly of said grooves, said intersection being at the junction between the straight and arcuate portions thereof when the angle between the axes of the members is 180°, the angle of intersection of the axes of said grooves being substantially constant in all degrees of angular adjustment of said universal joint and a ball in each set of opposed grooves at the intersection of the axis thereof.

21. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves, a ball in each set of opposed grooves at the intersection of the axes thereof, the grooves of each of two sets being so fashioned that the distance between the points of intersection of the axes thereof is constant in all opertaive positions of said members relative to each other about the fixed intersecting point in their axes, and means for holding said members in assembled relation for movemeint as aforesaid about said fixed intersecting point in their axes including connecting means between the balls in said two sets of grooves and secured thereto for maintaining the distance between said last-mentioned balls constant.

22. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, a ball in each set of opposed grooves at the intersection of the axes thereof and a rigid strut joined at its ends to the balls of two sets of grooves in a manner such that the distance between the latter balls is maintained constant.

23. A constant velocity universal joint comprising a pair of rotary members angularly movable relative to each other about a fixed intersecting point in the axes thereof and having oppositely axially extending interspersed lugs the opposed faces of adjacent lugs being fashioned with grooves to provide sets of opposed grooves with the axes of the grooves of each set intersecting, a ball in each set of opposed grooves at the intersection of the axes thereof and a strut joined at its ends to the balls of two sets of grooves in a manner such that the distance between the latter balls is maintained constant.

24. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, a ball in each set of opposed grooves at the intersection of the axes thereof, the grooves of each of two sets being so fashioned that the distance between the points of intersection of the axes thereof is constant in all operative positions of said members relative to each other about the fixed intersecting point in their axes.

25. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting, a ball in each set of opposed grooves at the intersection of the axes thereof, the grooves of each set being so fashioned that the distance from the point of intersection of the axes thereof to the fixed intersecting point in the axes of the rotary members is constant in all operative positions of said members relative to each other about the fixed intersecting point in their axes.

26. A constant velocity universal joint comprising a pair of rotary members angularly movable relative to each other about a fixed intersecting point in the axes thereof and having oppositely axially extending interspersed lugs, the opposed faces of adjacent lugs being fashioned with grooves to provide sets of opposed grooves with the axes of the grooves of each set intersecting and each extending at an oblique angle to and diverging outwardly from the axis of the corresponding member toward said other member, a ball in each set of opopsed grooves at the intersection of the axes thereof, the grooves of each set being adapted to intersect with substantially the same angle between their axes in all angular positions of said members within the normal operating range thereof, the angle between the axes of the grooves of each set being within the range of 30°–40°.

References Cited in the file of this patent

UNITED STATES PATENTS

| | | |
|---|---|---|
| 1,677,311 | Weiss | July 17, 1928 |
| 1,774,578 | Weiss | Sept. 2, 1930 |
| 1,868,540 | Myers | July 26, 1932 |
| 2,149,352 | Leaman | Mar. 7, 1939 |
| 2,473,036 | Miller | June 14, 1949 |
| 2,584,097 | Trbojevich | Jan. 29, 1952 |
| 2,839,905 | Trbojevich | June 24, 1958 |

FOREIGN PATENTS

| | | |
|---|---|---|
| 1,157,482 | France | Dec. 30, 1957 |